United States Patent Office 3,637,733
Patented Jan. 25, 1972

3,637,733
2-BENZIMIDAZOLECARBAMIC ACID ESTERS FROM o-PHENYLENEDIAMINES, CYANAMIDE AND DIALKYL CARBONATES
Rudolf Schlatter, Chadds Ford, Pa., and Charles D. Adams, Wilmington, Del., assignors to E. I. du Pont de Nemours and Company, Wilmington, Del.
No Drawing. Continuation-in-part of application Ser. No. 674,739, Oct. 12, 1967, which is a continuation-in-part of application Ser. No. 594,384, Nov. 15, 1966. This application Nov. 21, 1968, Ser. No. 777,919
Int. Cl. C07d 49/38
U.S. Cl. 260—309.2   3 Claims

ABSTRACT OF THE DISCLOSURE

A process for making 2-benzimidazolecarbamic acid, alkyl esters by reacting cyanamide or a cyanamide salt with a dialkyl carbonate at a temperature between 30° C. and 120° C. to form an alkyl cyanocarbamate salt, then reacting the alkyl cyanocarbamate salt with an o-phenylenediamine at a temperature between 40° and 130° C. to form the desired product and recovering it from the reaction mixture.

The 2-benzimidazolecarbamic acid, alkyl esters, are useful as intermediates in the preparation of dialkyl esters of 2-aminobenzimidazole-1-carboxylic acids, which are excellent fungicides.

CROSS REFERENCE TO RELATED APPLICATIONS

This application is a continuation-in-part of our copending application Ser. No. 674,739, filed Oct. 12, 1967, now abandoned, which application is a continuation-in-part of our then copending application Ser. No. 594,384, filed Nov. 15, 1966, now abandoned.

BRIEF SUMMARY OF THE INVENTION

This invention relates to novel processes for the manufacture of alkyl esters of certain benzimidazolecarbamic acids. More particularly, this invention relates to processes for the manufacture of such esters from o-phenylenediamines, cyanamide or cyanamide salts and dialkyl carbonates.

Alkyl esters of 2-benzimidazolecarbamic acids represented by the formula:

(I) 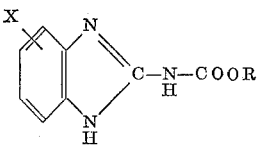

where

R is alkyl of 1 through 4 carbon atoms; and
X is hydrogen, halogen, nitro or alkyl of 1 through 4 carbon atoms;

are useful as intermediates in the preparation of dialkyl esters of 1-carboxy-2-benzimidazolecarbamic acids represented by the formula:

(II) 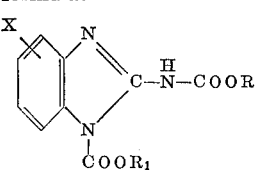

where

X is as defined in Formula I above and
R and $R_1$ are the same or different and are alkyl of 1 through 4 carbon atoms.

These compounds are disclosed in U.S. Pat. 2,933,504 and are very useful as fungicides.

U.S. Pat. 3,010,968 describes a process for making the 2-benzimidazolecarbamic acid esters of Formula I by reacting thiourea with dimethyl sulfate to produce 2-methyl-thiopseudourea sulfate. This reaction product is then reacted with an alkyl chloroformate and a base to produce an acylated 2-methylthiopseudourea, which is then reacted further with an o-phenylenediamine in the presence of a protonic acid to produce the desired product.

The process of this invention has several advantages over the process set forth in the above patent. One particular advantage is that commercially available, inexpensive, technical-grade cyanamide salts or cyanamide solutions can be used instead of the relatively more expensive thiourea materials. Further, the process of this invention does not require the handling or disposal of obnoxious mercaptan materials which are by-products of the art process. Additionally, the process of this invention can be conducted in a batch or continuous manner with normal reaction vessels and finally, dialkyl carbonates do not cause corrosion problems in storage vessels, and process reactors as alkyl chloroformates would be prone to do.

The process of this invention can be summarized by the following equations when a salt of cyanamide is employed:

(Step 1)
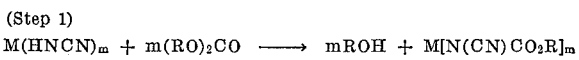
cyanamide    dialkyl        alkyl
salt         carbon-        cyanocarbamate
             ate            salt
or

(Step 2)
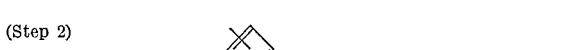
alkyl              o-phenylene-
cyano-             diamide
carbamate
salt

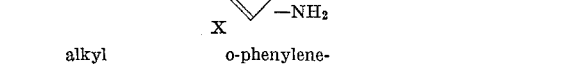
alkyl ester of
2-benzimidazolecarbamic
acid where

R is alkyl of 1 through 4 carbon atoms; and
X is hydrogen, halogen, nitro or alkyl of 1 through 4 carbon atoms;
M is an alkali metal or an alkaline earth metal; and
m is the valence of M and $H^+$ may be derived from any acid.

The cyanamide salt which reacts in Step 1 may be charged to the reactor as such or it may be generated in situ by adding cyanamide and a base separately to the reactor.

The 2-benzimidazolecarbamic acid alkyl esters produced by the process above can be converted to the esters shown in Formula II. This conversion reaction is summarized by the following equation:

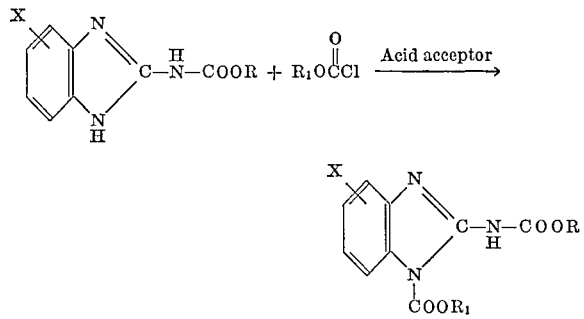

wherein

X, R and $R_1$ are as defined previously.

DETAILED DESCRIPTION OF THE INVENTION

In the first step of the process of the invention, the appropriate dialkyl carbonate is reacted with a salt of cyanamide in one of several solvents to form a salt of an alkyl cyanocarbamate. Readily available technical-grade salts are suitable for this process. Suitable starting materials are cyanamide alkaline earth or alkali metal salts, particularly the salts with magnesium, potassium, sodium and calcium. In the first step, when the dialkyl carbonate is reacted with a cyanamide salt, either a single salt, i.e., $M(HNCN)_m$ or a double salt, i.e., $$(M)_2(NCN)_m$$

can be used.

When cyanamide itself is the starting material, base is added in order to generate the cyanamide salt. This variation in the process is described by the following equation when sodium methoxide is used as base in Step 1 and acetic acid is used as acid in Step 2:

Step 1

$$NaOCH_3 + H_2NCN + (CH_3O)_2CO \xrightarrow{CH_3OH} Na[N(CN)CO_2CH_3] + 2CH_3OH$$

Step 2

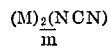

$$Na[N(CN)CO_2CH_3] + \text{} + 2CH_3CO_2H \xrightarrow{CH_3OH}$$

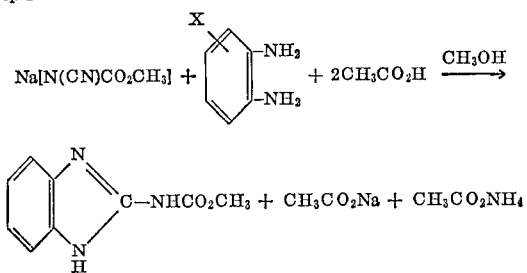

When triethylamine is used as base, the equations become:

Step 1

$$N(CH_2CH_3)_3 + H_2NCN + (CH_3O)_2CO \longrightarrow$$
$$[NH(CH_2CH_3)_3][N(CN)CO_2CH_3] + CH_3OH$$

Step 2

$$[NH(CH_2CH_3)_3][N(CN)CO_2CH_3] + \text{} + 2CH_3CO_2H \longrightarrow$$

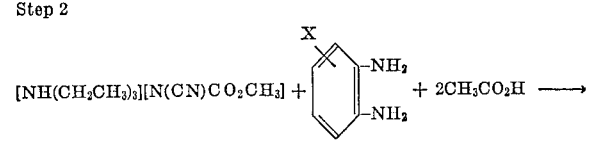

The concentrations of the starting materials in the reaction mixture are not critical; however, for economic reasons, high concentrations will usually be chosen. With respect to the slurry or solution of the cyanamide salts, the concentration is only limited by the handling characteristics of the slurry.

When a cyanamide salt is used in Step 1, it is preferred to add, with mixing, the dialkyl carbonate to the slurry or solution containing the cyanamide salt. When cyanamide is used in Step 1, the dialkyl carbonate and base can be added all at once to the cyanamide solution.

The temperature of this first step of the process can vary in the range of 30° C. to 120° C. Generally, the range of 60° C. to 100° C. is preferable. If desired, this step can be conducted at higher temperatures under pressure.

The alkyl cyanocarbamate salt is stable in the reaction medium and it can be used directly in the second step or held for a period of time, depending upon which is desirable from an equipment viewpoint. The reaction time can be from 5 minutes to 3 hours. The preferred reaction time will vary with the solvent. Higher temperatures and thus shorter reaction times, can be obtained by employing higher-boiling solvents.

In the second step of the reaction, o-phenylenediamine is added to the reaction product from Step 1, in an acidic media to produce the 2-benzimidazolecarbamic acid, alkyl ester. The o-phenylenediamine can be added to the reaction product while the product is at the temperature it was during the first step, 30° up to 120° C. Optionally, the o-phenylenediamine can be in the form of a salt of an acid. When o-phenylenediamine salts are used, the amount of acid required to maintain the desired degree of acidity is correspondingly reduced.

To carry out the condensation and ring closure reaction of Step 2, the reaction mixture should be acidic. The desired acidity can be gained by the addition of any of several acids, for example, formic acid, acetic acid, hydrochloric acid, sulfuric acid, phosphoric acid, hydroxyacetic acid, sulfamic acid and the like. If the reaction of Step 2 is carried out in water, the pH can range from 2.5 to 5.

The second step ring-closure reaction will occur at temperatures above 40° C.; it is preferred to heat during this step to speed the reaction to completion. The addition of heat is important in that the reaction of the second step would be too slow at low temperatures. The reaction mixture should be maintained above 40° C. preferably 60° to 120° C. The second step reaction can also be conducted under pressure if this is desired. If this is done, the temperature can go up to 140° C.

During the heating step, the desired product will precipitate. Thus the completion of precipitation is an indication that the reaction mixture has been heated for a sufficient period of time such that the reaction is complete. The reaction time can vary from 15 minutes to 4 hours. The preferred reaction time for Step 2 will vary depending upon the solvent used. Higher boiling solvents will allow higher reaction temperatures and thus allow shorter reaction times.

The desired product can then be recovered by any of the conventional means, for example, spray drying, filtration, or centrifuging, or it may be transferred to another liquid medium by distillation of the solvent.

Several different organic solvents as well as water can be employed as solvents for this process. Among the organic solvents, the lower alcohols, methanol, ethanol, n-propanol, isopropanol, n-butanol, and sec-butanol are preferred. When alcohols are used as solvents and free cyanamide instead of a cyanamide salt is charged to reactor in Step 1, the sodium or potassium alkoxide corresponding to the alcohols makes a suitable base for Step 1. When water is used as solvent and free cyanamide instead of a cyanamide salt is used, the oxides and hydroxides of the alkali metals and alkaline earth metals are suitable as bases in Step 1.

Trialkylamines are suitable as bases when Step 1 is conducted in either organic solvents or water. Suitable trialkylamines are represented by the formula, $R_3N$, where R is alkyl of 1–3 carbon atoms. Trimethylamine, triethylamine, and triethylenediamine are preferred.

In the overall reaction, the reactants can be used in the mole equivalent ratios indicated in the following table:

| Reactants | Mole equivalents | Preferred mole equivalents |
|---|---|---|
| Cyanamide or cyanamide salts | 1–3 | 1–2.2 |
| Dialkyl carbonate | 1–3 | 1–1.8 |
| o-Phenylenediamine or derivatives thereof | 1 | 1 |

It should be understood that the molar concentrations are not critical at the upper limit; however, they will not be practical or economical at higher levels. It is obvious that the concentration in the second step will depend upon the concentration in the first.

The following examples exemplify the process of the invention, all parts are parts by weight unless otherwise indicated.

Example 1

A mixture of 36.0 parts of dimethyl carbonate, 16.8 parts of cyanamide, 84.3 parts of 25.7% sodium methoxide in methanol, and 200 parts of methanol is refluxed (66° C.) for an hour. Then 42.0 parts of o-phenylenediamine and 63.0 parts of acetic acid are; added and refluxing (69° C.) is continued for 4 hours. The mixture is cooled and filtered. The product is washed with methanol and water and dried. This procedure gives 25.0 parts of 2-benzimidazolecarbamic acid, methyl ester.

Example 2

Sodium metal (7.9 parts) is dissolved in 240 parts of ethanol. Then 40.7 parts of diethyl carbonate and 14.5 parts of cyanamide are added and the resulting solution is refluxed (80° C.) for 45 minutes. Acetic acid (52.5 parts) and o-phenylenediamine (37.1 parts) are added and refluxing is continued for 4 hours. The mixture is cooled and filtered. The product is washed with ethanol and water and dried. This procedure gives 16.5 parts of 2-benzimidazolecarbamic acid, ethyl ester.

Example 3

A mixture of 33.6 parts of 50% cyanamide solution, 36.0 parts of dimethyl carbonate, and 250 parts of water is heated to 60° C. This temperature is maintained while 40.4 parts of triethylamine is added during 15 minutes. The reaction mass is held at 60° C. for another 45 minutes and then 39.3 parts of o-phenylenediamine and 63.5 parts of acetic acid are added. The reaction mass is refluxed (95° C.) for 2.5 hours, cooled, and filtered. The product is washed with water and dried. This procedure gives 8.8 parts of 2-benzimidazolecarbamic acid, methyl ester.

Example 4

Dimethyl carbonate (180 parts) and technical calcium cyanamide (100 parts) are charged to 500 parts of water. After the initial, mildly exothermic reaction has subsided, the reaction mass is refluxed (81° C.) for 1.5 hours. It is then cooled to 30° C. and filtered. The insolubles are washed with water (2×50 parts) and the wash is combined with the filtrate. To the filtrate is added 119 parts of o-phenylenediamine and 83.7 parts of 37% hydrochloric acid. The reaction mass is then heated at 95° C. for 50 minutes, cooled to 50° C., and filtered. The product is washed with water and acetone. This procedure gives 24.1 parts of 2-benzimidazolecarbamic acid, methyl ester.

Example 5

A mixture of 6.4 parts of sodium hydrogen cyanamide and 9.0 parts of dimethyl carbonate in 40 parts of methanol is refluxed for 30 minutes. Then 100 parts of water, 9.8 parts of o-phenylenediamine, and 26.3 parts of acetic acid are added. The resulting mixture is heated on a steam bath for 30 minutes, cooled, and filtered. The product is washed with water and acetone and then dried. This procedure gives 4.2 parts of 2-benzimidazolecarbamic acid, methyl ester.

We claim:

1. In the process for making a 2-benzimidazolecarbamic acid ester of the formula:

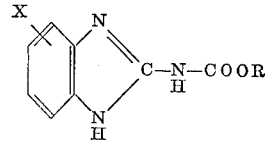

wherein

R is alkyl of 1 through 4 carbon atoms; and

X is hydrogen, halogen, nitro or alkyl of 1 through 4 carbon atoms;

by reacting an alkyl cyanocarbamate salt obtained from a cyanamide salt with an o-phenylenediamine of the following formula:

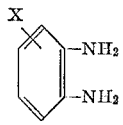

wherein

X is hydrogen, halogen, nitro or alkyl of 1 through 4 carbon atoms;

the improvements comprising reacting said cyanamide salt with a dialkyl carbonate wherein the alkyl is 1 through 4 carbon atoms to form said alkyl cyanocarbamate salt and reacting said alkyl cyanocarbamate salt and said o-phenylenediamine in an acidic medium until the precipitation of the desired 2-benzimidazolecarbamic acid ester is complete.

2. The process of claim 1 wherein the reactants are present in the following mole equivalents:

| | Moles |
|---|---|
| o-Phenylenediamine | 1 |
| Dialkyl carbonate | 1–3 |
| Cyanamide salt | 1–3 |

3. A process for making 2 benzimidazolecarbamic acid, methyl ester, comprising reacting cyanamide calcium salt with dimethyl carbonate at a temperature between 60 C. and 100° C. to form methyl cyanocarbamate calcium salt, reacting said methyl cyanocarbamate salt with o-phenylenediamine in the presence of water and an acid, at a pH from 2.5 to 5 and at a temperature between 60° C. and 120° C., and recovering said 2-benzimidazole carbamic acid, methyl ester from the reaction mixture.

References Cited

Derwent Pharmaceutical Documentation Specification book No. 463, Feb. 4, 1966, 19779–19841, pp. 239–43
Derwent Basic No. 19830, R710.D4 Pt 4 (reprint of Belgian Pat. 666,795).

NATALIE TROUSOF, Primary Examiner

U.S. Cl. X.R.

260—482 C, 999